United States Patent [19]

Kato

[11] Patent Number: 4,766,489

[45] Date of Patent: Aug. 23, 1988

[54] ELECTRONIC ENDOSCOPE WITH IMAGE EDGE ENHANCEMENT

[75] Inventor: Tadashi Kato, Hachioji, Japan

[73] Assignee: Olympus Optical Co., Ltd., Tokyo, Japan

[21] Appl. No.: 80,364

[22] Filed: Jul. 30, 1987

[30] Foreign Application Priority Data

Aug. 1, 1986 [JP] Japan .................................. 61-181630

[51] Int. Cl.[4] .......................... A61B 1/04; H04N 7/18
[52] U.S. Cl. .......................................... 358/98; 128/6
[58] Field of Search ....................... 358/98, 29, 42, 37; 128/6

[56] References Cited

U.S. PATENT DOCUMENTS 4,532,918 8/1985 Wheeler ............................ 358/98 X
4,621,284 11/1986 Nishioka et al. ...................... 358/98

Primary Examiner—Howard W. Britton
Assistant Examiner—Victor R. Kostak
Attorney, Agent, or Firm—Armstrong, Nikaido, Marmelstein & Kubovcik

[57] ABSTRACT

An electronic endoscope comprises an endoscope provided with an imaging device. A signal treating circuit produces color signals from output signals of the imaging device. Image enhancers respectively enhance the edges of the images of the color signals produced by the signal treating circuit. An image enhanced amount setting circuit respectively set the image enhanced amounts by the image enhancers independently of the respective color signals.

8 Claims, 5 Drawing Sheets

FIG.3(a) INPUT SIGNAL

FIG.3(b) OUTPUT SIGNAL OF FIRST DELAY LINE 32

FIG.3(c) OUTPUT SIGNAL OF SECOND DELAY LINE 33

FIG.3(d) OUTPUT SIGNAL OF ADDER 34

FIG.3(e) OUTPUT SIGNAL OF ½-REVERSER 35

FIG.3(f) IMAGE ENHANCING COMPONENT

FIG.3(g) IMAGE ENHANCED OUTPUT SIGNAL

ELECTRONIC ENDOSCOPE WITH IMAGE EDGE ENHANCEMENT

BACKGROUND OF THE INVENTION

1. Field of the Invention

This invention relates to an electronic endoscope in which variations of a specific color component can be distinquished.

2. Related Art Statement

Various endoscopes (which shall be called electronic endoscopes in the present invention) have been developed in which a solid state imaging device, as a charge coupled device (CCD), are used.

One advantage of these electronic endoscopes is that the resolving degree is higher than a fiberscope. In addition, it is easier to record and reproduce picture images and picture image treatments such as the magnification of picture images. Thus, the comparison between two picture images is easier.

In the conventional television camera or the like, a luminance signal Y and color difference signals R-Y and B-Y are formed from imaged red (R), green (G) and blue (B) color signals. The luminance signal Y is treated in order to be enhanced in the image so as to improve the resolving degree of the picture quality. In the same manner, even the above mentioned electronic endoscopes have an enhanced image. For example, in an electronic endoscope of a field sequential system, the respective image enhanced amounts of the imaged R, G and B color signals have been enhanced the same amount.

However, if, as described above, only the luminance signal Y or each of the R, G and B color signals is enhanced by the same amount in the image, each color component will be equally enhanced in the image. Therefore, one problem that arises is, for example, when a specific color component which characterizes a deseased part is enhanced, color components other than this specific color component will also be enhanced in the image. Thus, the variation of this specific component will not be distinguished from the other color components and no sufficient diagnosis effect will be obtained.

OBJECTS AND SUMMARY OF THE INVENTION

One object of the present invention is to provide an electronic endoscope whereby the image enhanced amounts of respective color signals (i.e., edge stressing) can be independently set.

Another object of the present invention is to provide an electronic endoscope whereby the variation of a specific color component can be distinguished.

A further object of the present invention is to provide an electronic endoscope whereby the features of various diseased parts can be extracted and the optimum diagnoses of various diseased parts can be made.

The electronic endoscope of the present invention comprises an endoscope provided with an imaging means and a signal treating means which produces a color signal from an output signal of the imaging means. An image enhancing means enhances the images (i.e., enhances the outline or edge of the image) of the color signals produced by the signal treatment means. An image enhanced amount setting means sets the image enhanced amounts an image enhancing means independently of the respective color signals.

The other features and advantages of the present invention will become apparent with the following explanation.

BRIEF DESRIPTION OF THE DRAWINGS

FIGS. 1 and 3 relate to the first embodiment of the present invention.

FIGS. (3a–3g) are a waveform diagram showing the operation of the image enhancer.

Figure 4:
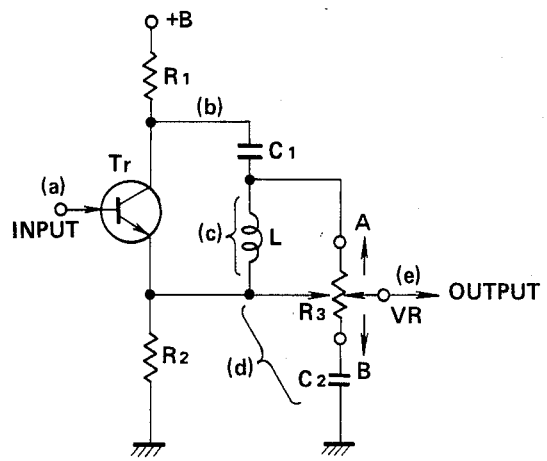

FIGS. 4 and 5 relate to the second embodiment of the present invention.

FIG. 4 is a circuit diagram showing an image enhancer.

FIGS. 5a–5e are a waveform diagram showing the operation of the image enhancer.

Figure 6:
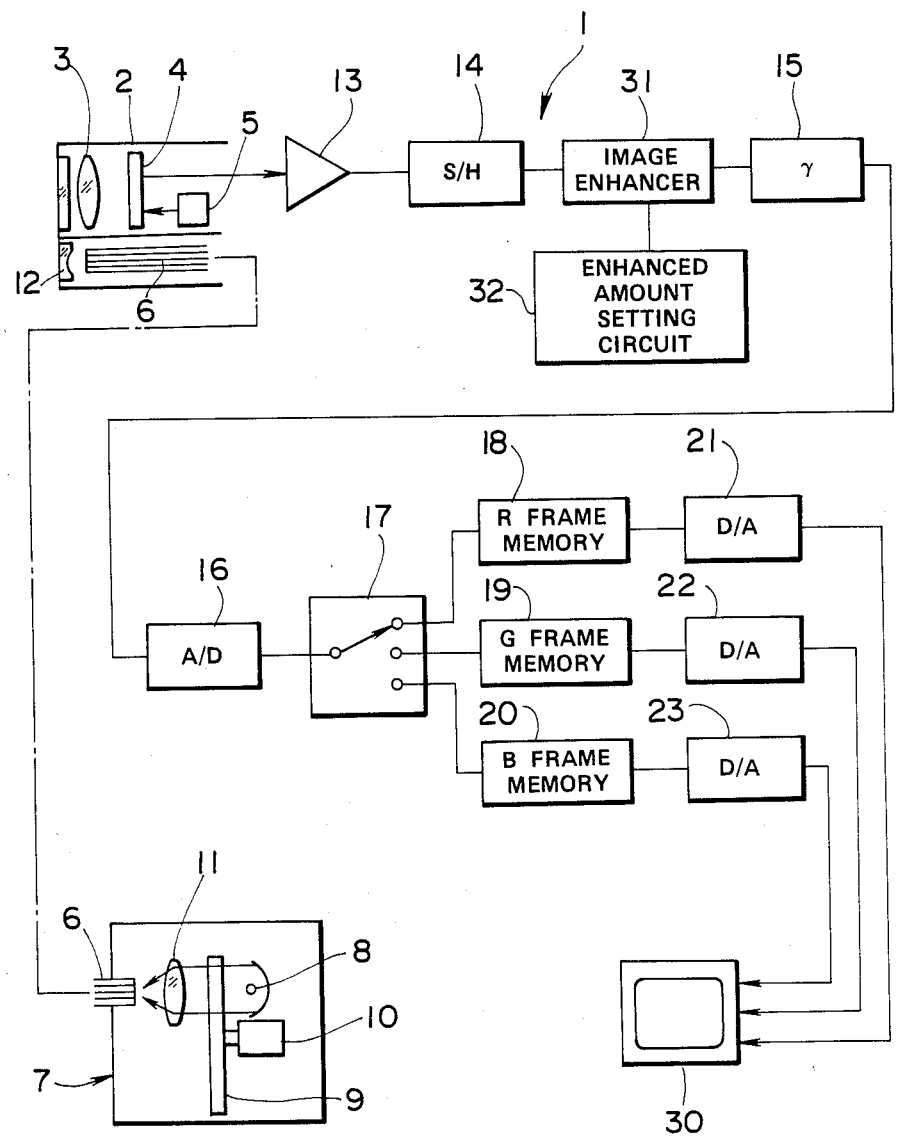

FIG. 6 is an explanatory diagram showing the formation of the electronic endoscope of the third embodiment of the present invention.

DETAILED DESCRIPTION OF THE PREFERRED EMBODIMENTS

Figure 1:
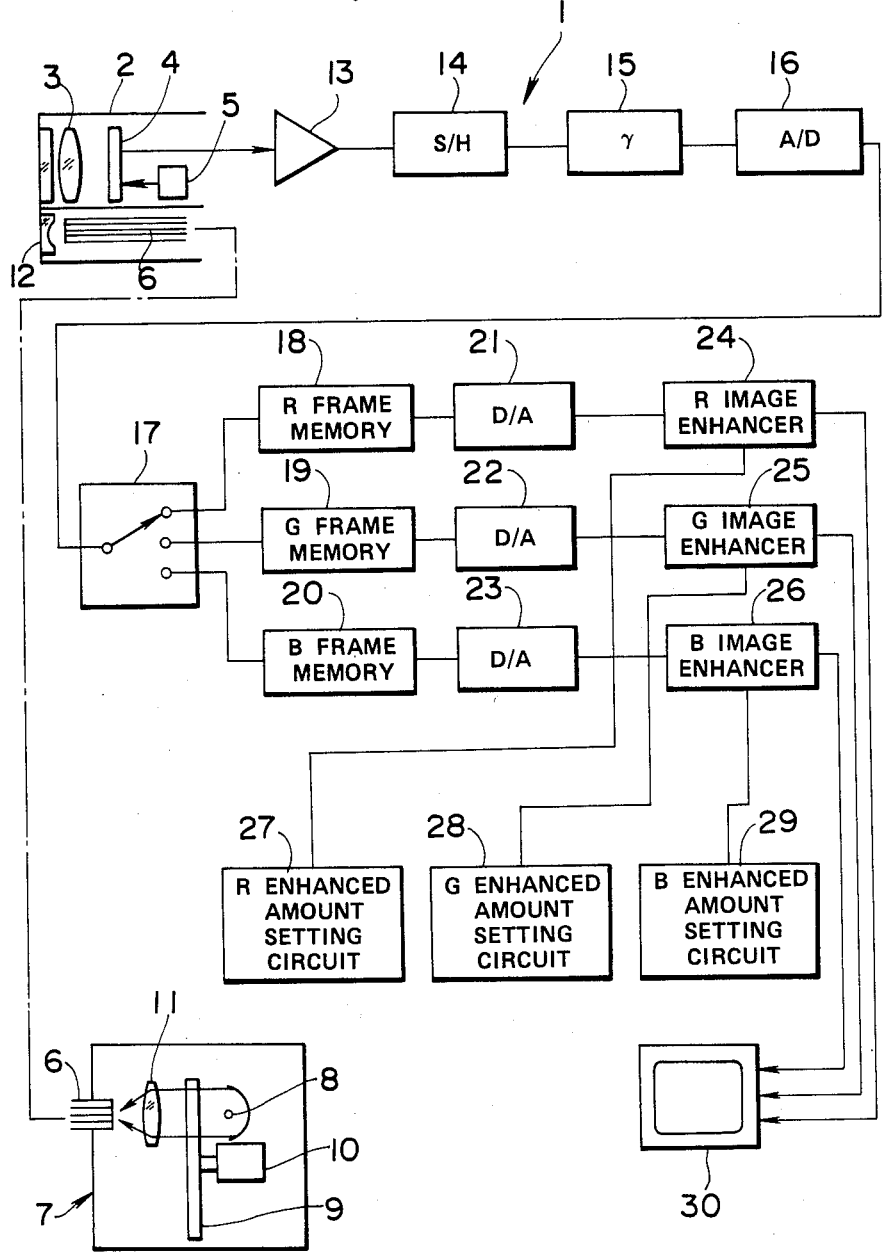
FIG. 1 is an explanatory diagram showing the formation of an electronic endoscope.
Figure 2:
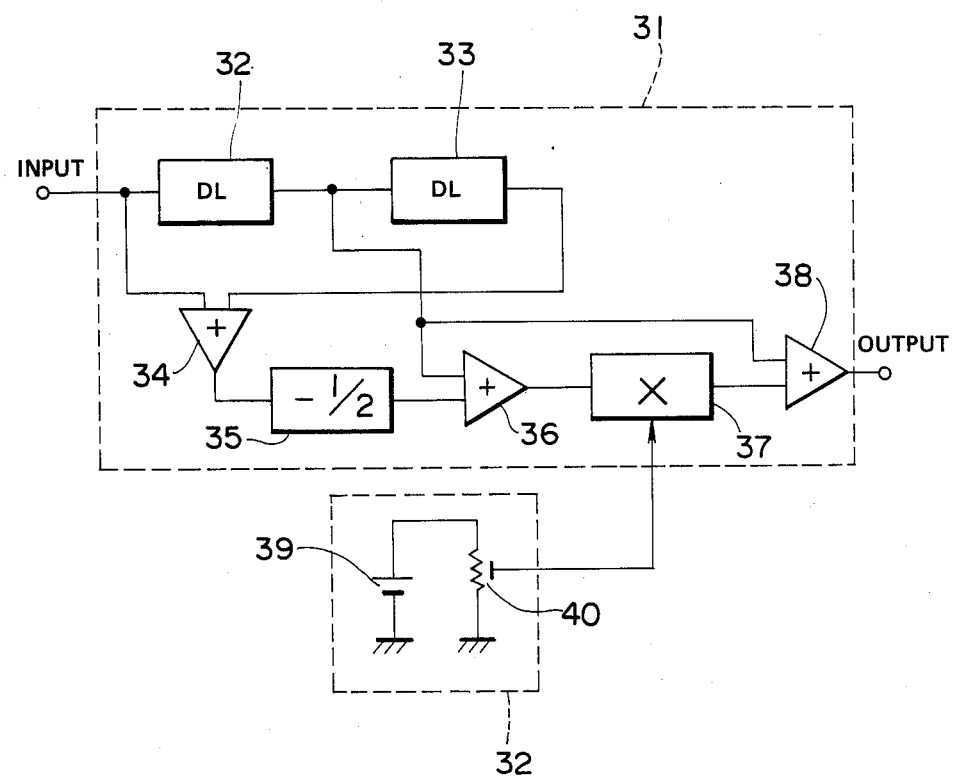
FIG. 2 is a block diagram showing an image enhancer and enhanced amount setting circuit.
Figure 3:
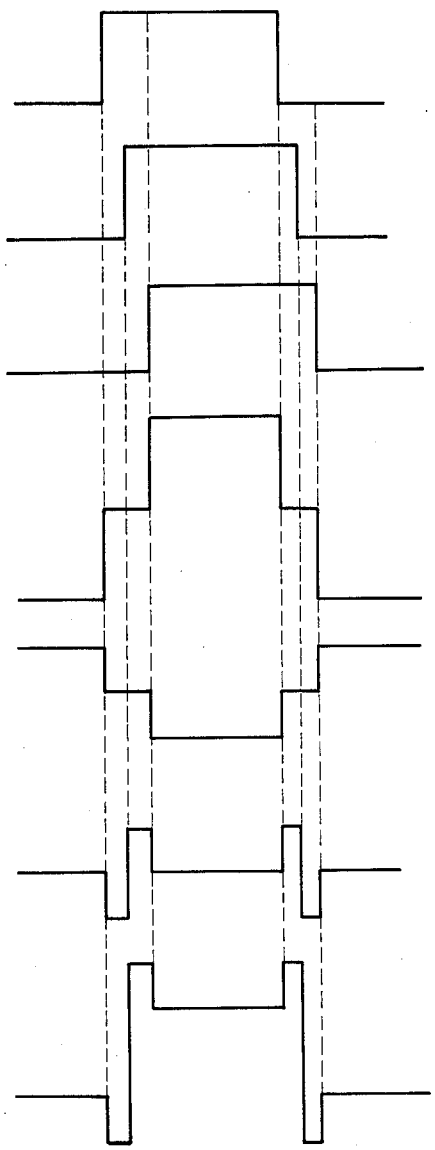

The first embodiment is shown in FIG. 1 to 3. As shown in FIG. 1, in an electronic endoscope 1, an image forming objective 3 is contained on the tip side of an elongated insertable part 2. A solid state imaging device 4, driven by a driving circuit 5, is arranged in the image forming position of the objective 3.

A light guide 6, formed of a flexible fiber bundle, is inserted as an illuminating light transmitting means through the insertable part 2. The light guide 6 can be removably fitted at the rear end to a light source device 7. Within the light source device 7, a light source lamp 8 is arranged. A rotary color filter 9, consisting of color passing filters of three primary colors of red (R), green (G), and blue (B), is arranged in front of the light source 8. The rotary color filter 9 is to be rotated and driven, for example, by a stepping motor 10. The illuminating light from the light source lamp 8 outputs light having wavelengths or red, green and blue in sequence through the rotary color filter 9. The illuminating light is condensed by a condenser 11 and enters the light guide 6 at the rear end. The illuminating light is projected from the tip of the light guide 6 through the light guide 6 and is used to illuminate an object in the sequence of the color fields through a light distributing lens 12.

The reflected light, corresponding to the respective color lights of red, green and blue from the object, are received in sequence by the solid state imaging device 4 through the objective 3. A signal, corresponding to each picture element of the solid state imaging device 4, is output in sequence, for example, in the lateral direction by a clock signal applied from the driving circuit 5. The picture element signal is first amplified by a preamplifier 13. The amplified signal has a video signal extracted by a sample holding circuit 14. The signal is further $\gamma$ (gamma)-corrected by a $\gamma$-corrector 15 and is then converted to a digital signal by an A/D converter 16. The video signal is switched synchronously with the illumination in the sequence of the color fields by a multiplexer 17. The signal is then stored in an R frame memory 18, G frame memory 19 and B frame memory 20 corresponding to the respective colors of red, green and blue in sequence. The respective frame memories 18, 19 and 20 are simultaneously read out, for example, in the lateral direction at a speed which matches the displaying device such as a color CRT (cathode ray tube) monitor 30. The read out signals are respectively converted to analog signals by D/A converters 21, 22 and 23 into R, G and B color signals.

In this embodiment, the above mentioned respective R, G and B color signals are treated as edge or outline enhanced in the image respectively by an R image enhancer 24, G image enhancer 25 and B image enchancer 26. The image enhanced amounts by the above mentioned respective edge image enhancers 24, 25 and 26 can be independently set respectively by an R enhanced amount setting circuit 27, G enhanced amount setting circuit 28 and B enhanced amount setting circuit 29. The R, G and B color signals enhanced in the image with the independently set image enhanced amounts are output into the color CRT monitor 30 to color-display the object.

The formations of the respective image enhancers 24, 25, and 26 of the respective enhanced amount setting circuits 27, 28 and 29 shall be explained by the following with reference to FIG. 2.

The respective edge image enhancers 24, 25 and 26 all have the same formation and are represented by the reference numeral 31 in FIG. 2. Also, the respective enhanced amount setting circuits 27, 28 and 29 all have the same formation and are represented by the reference numeral 32 in FIG. 2.

As shown in FIG. 2, the image enhancer 31 includes first and second delay lines 32 and 33 which delay the input signals. An adder 34 adds these delayed input signals. The output signals of the delay lines 32 and 33 are connected in series with the input signals. A ½-reverser 35 reverses by ½ the output signal for the adder 34. An adder 36 adds the output signal of the ½-reverser 35 and the output signal of the first delay line 32. A multiplier 37 multiplies the output signal of the adder 36 in order to have the output signal be a predetermined size. An adder 38 adds the output signal of the multiplier 37 and the output signal of the first delay line 32 and outputs the results.

On the other hand, the enhanced amount setting circuit 32 is formed of a current source 39 and a variable resistance 40 connected to the current source. The DC voltage divided by the variable resistance 40 is applied to a multiplied amount setting terminal of the multiplier 37.

The operation of the image enhancer 31 shall be explained by the following with reference to FIG. 3.

The input signal is shown in FIG. 3(a). In FIG. 3(b) and 3(c), the input signal is delayed by one picture element each by the first and second delay lines 32 and 33. The output signal 3(c) of the second delay line 33 is delayed by two picture elements. The input signal 3(a) is added together with the delayed signal 3(c) by the adder 34 to obtain an output signal 3(d). The output signal 3(d) of the adder 34 is halved and reversed by the ½-reverser 35 to obtain an output signal 3(e). The output signal 3(e) of the ½-reverser 35 and the output signal 3(b) of the first delay line 32 are added together to obtain an image enhancing component 3(f). This image enhancing component 3(f) is set by the multiplier 37 to be of a predetermined size and is added to the output signal 3(b) of the above mentioned first delay line 32 to obtain an output signal 3(g) enhanced in the image.

The multiplied amount by the multiplier 37 is determined by a DC voltage input from the variable resistance 40 of the enhanced amount setting circuit 32. Therefore, the image enhanced amount by the image enhancer 31 can be freely set by adjusting the variable resistance 40. The electronic volume, such as for controlling a microcomputer, can be used for the variable resistance.

When the input signal is delayed by one picture element by the first and second delay lines 32 and 33 as described above, the image in the direction horizontal to the picture surface will be edge enhanced. The delayed amount by the first and second delay lines 32 and 33 may be larger than one picture element. If the delayed amount is made larger, the image of a lower frequency component will be able to be enhanced. Further, if the delayed amount of the first and second delay lines 32 and 33 is made by one horizontal scanning line, the image in the direction vertical to the picture surface will be able to be enhanced. If two sets of edge image enhancers 31 are used, one set to enhance the image in the horizontal direction with the picture surface and the other set to enhance the image vertically to the picture surface, a two-dimensional image will be able to be enhanced.

Thus, according to this embodiment, since the edge image enhancers 24, 25 and 26 are respectively independently provided to enhance the images of the R, G and B color signals and the enhanced amount setting circuits 27, 28 and 28 respectively independently set the image enhanced amount by these image enhancers 24, 25, and 26, the variation of a specific color component can be distinguished by varying the image enhanced amounts of the R, G and B color signals. Thus, an optimum image corresponding to a diagnosing position can be enhanced. For example, a vein can be easily distinguished by increasing the image enhanced amount of the G signal. Similarly, a bloody ulcer can be easily distinguished from a normal pinky mucous membrane by increasing the image enhanced amount of the B signal. Thus, according to this embodiment, the features of various diseased parts can be extracted and it becomes easy to make the optimum diagnoses of the diseased parts.

In this embodiment, R, G, and B color signals are used as color signals, but the color signals may be of such complementary colors as cyanogen, magneta and yellow. The image enhancer may not be provided for each of the R, G and B color signals but may be provided for only one or two of the color signals.

The second embodiment of the present invention is shown in FIGS. 4 and 5.

Figure 5A:
Figure 5B:
Figure 5C:
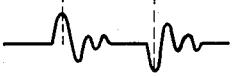
Figure 5D:
Figure 5E:

In this embodiment, when an input signal (a), (FIG. 5(a)) is applied to the base of a transistor Tr, as the high range component of the color signal is bypassed by a condenser $C_2$, the signal obtained on the collector side of the transistor Tr will have the high range component enhanced as shown by (b), 5(b). When the signal (b) is applied to a series resonant circuit of a condenser $C_1$ and coil L, the ringing voltage such as is shown by (c), 5(c) will be obtained at both ends of the coil L. The voltage at both ends of the coil L is applied to an enhanced amount setting variable resistance VR. The emitter voltage such as is shown by (d), 5(d) loses a high range component in the integrating circuit of the variable resistance VR and condenser $C_2$. Therefore, the size of the above mentioned ringing operation (c) is controlled by adjusting the variable resistance VR. When the sliding terminal of the variable resistance VR is moved in the direction A in FIG. 4, the output signal, to which preshoots and overshoots are added and which is edge enhanced in the image such as is shown by (e), 5(e) will be obtained. When the variable resistance VR is moved reversely in the direction B, the output signal has a soft image as is shown by (d).

The other functions and effects are the same as in the first embodiment.

The image enhancer is not limited to the above mentioned embodiment but various known circuit formations can be used.

FIG. 6 is a formation diagram of an electronic endoscope showing the third embodiment of the present invention.

In this embodiment, the edge image enhancer 31 is inserted between the sample holding circuit 14 and the γ (gamma)-correcting circuit 15. The image enhanced amount by the edge image enhancer 31 can be set by the enhanced amount setting circuit 32.

In this embodiment, as the R, G and B color signals are input in sequence into the image enhancer 31, the R, G and B color signals can be edge enhanced in the image with the image enhanced amounts respectively independently set by switching the image enhanced amount set by the enhanced amount setting circuit 32 synchronously with the switching of the R, G and B color signals.

Also, in this embodiment, the image in the vertical direction to the picture surface can be enhanced by sequentially outputting the signals corresponding to the respective picture elements of the solid state imaging device 4 and making the delayed amount of the first and second delay lines 32 and 33 of the image enhancer 31, for example, one picture element. In this case, the respective frame memories 18, 19 and 20 are read out in the lateral direction similar to the first embodiment.

According to this embodiment, each of the image enhancers 31 and the enhanced amount setting circuits 32 may be only one circuit.

The other functions and effects are the same as in the first embodiment.

The present invention can be applied not only to an electronic endoscope of a field sequential system but also to an electronic endoscope of a single disc system with a color mosaic filter arranged in front of a solid state imaging device. The present invention can also be applied to an electronic endoscope wherein color difference signals R-Y and B-Y are used for color signals. In this case, the R, G and B color signals formed of the luminance signal Y and color difference signals R-Y and B-Y may be edge enhanced in the image with respectively independent image enhanced amounts. Alternatively, the luminance signal Y and color differnece signals R-Y and B-Y may be edge enhanced in the image with the respectively independent image enhanced amounts so that the R, G and B color signals formed of the luminance signal Y and color difference signals R-Y and B-Y may be indirectly edge enhanced in the image with respectively independent image enhanced amounts.

In the same manner, the present invention can also be applied to complementary colors such as yellow (Ye), magenta (Mg) and cyanogen (Cy) or white (W), green (G) and yellow (Ye). Further, according to the present invention, by simultaneously enhancing R and G in the image, Ye can be enhanced in the image, by simultaneously enhancing G and B in the image, Cy can be enhanced in the image and by simultaneously enhancing R and B, Mg can be enhanced in the image.

It is apparent that, in this invention, working modes different in a wide range can be formed on the basis of the invention without deviating from the spirit and scope of the invention. This invention is not restricted by its specific working mode except being limited by the appended claims.

What is claimed is:

1. An electronic endoscope comprising:
   an endoscope provided with an imaging means;
   a signal treating means for producing color signals from output signals of said imaging means;
   an image enhancing means for enhancing edges of the images of the color signals produced by said signal treating means; and
   an image enhanced amount setting means for setting the image enhanced amount by said image enhancing means independently of the respective color signals.

2. An electronic endoscope according to claim 1 wherein said signal treating means is to produce red, green and blue color signals from the output signals of said imaging means.

3. An electronic endoscope according to claim 2 wherein said image enhancing means comprises three edge image enhancers which independently enhance edges of the images of the color signals produced by said signal treating means, said image enhanced amount setting means comprises three image enhanced amount setting circuits which independently set the respective image enhanced amounts by said respective image enhancers.

4. An electronic endoscope according to claim 1 wherein said signal treating means is provided with frame memories respectively storing red, green and blue color signals input in a time series in response to a red, green and blue color field sequential illuminating light, said image enhancing means comprises three edge image enhancers respectively independently enhancing edges of the images of red, green and blue color signals simultaneously read out of said respective frame memories, said image enhanced amount setting means comprises three image enhanced amount setting circuit which independently set the respective image enhanced amounts by said respective image enhancers.

5. An electronic endoscope according to claim 1 wherein said image enhancing means comprises image enhancers respectively enhancing edges of the images of red, green, and blue color signals input in a time series in response to a red, green and blue color field sequential illuminating light, said image enhanced amount setting means comprises image enhanced amount setting circuits which respectively synchronously switch the image enhanced amounts by said image enhancers with the switching of said color signals.

6. An electronic endoscope according to claim 1 wherein said imaging means is a solid state imaging device provided in a tip part of an insertable part of the endoscope.

7. An electronic endoscope according to claim 1 wherein said image enhancing means is to enhance edges of the images in a direction horizontal with a picture surface.

8. An electronic endoscope according to claim 1 wherein said image enhancing means is to enhance edges of the images in a direction vertical to a picture surface.

* * * * *